(12) United States Patent
Zhu et al.

(10) Patent No.: US 8,009,424 B2
(45) Date of Patent: Aug. 30, 2011

(54) LATCHING DEVICE AND ELECTRONIC DEVICE USING THE SAME

(75) Inventors: Hong-Wei Zhu, Shenzhen (CN); Er-Zheng Zhao, Shenzhen (CN); Hai-Yang Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 124 days.

(21) Appl. No.: 12/498,377

(22) Filed: Jul. 7, 2009

(65) Prior Publication Data
US 2010/0053857 A1    Mar. 4, 2010

(30) Foreign Application Priority Data

Aug. 26, 2008 (CN) .......................... 2008 1 0304193

(51) Int. Cl.
*G06F 1/16* (2006.01)
(52) U.S. Cl. ......... 361/679.58; 361/679.26; 361/679.27; 292/251.5
(58) Field of Classification Search ............... 361/679.58
See application file for complete search history.

(56) References Cited

U.S. PATENT DOCUMENTS

| | | | | |
|---|---|---|---|---|
| 6,517,129 | B1 * | 2/2003 | Chien et al. ................ | 292/251.5 |
| 6,659,516 | B2 * | 12/2003 | Wang et al. ................ | 292/251.5 |
| 7,054,149 | B2 * | 5/2006 | Lev et al. ................. | 361/679.58 |
| 7,405,927 | B2 * | 7/2008 | Lev .......................... | 361/679.55 |
| 7,543,862 | B2 * | 6/2009 | Lin .......................... | 292/251.5 |
| 2005/0018393 | A1 * | 1/2005 | Kuo et al. .................. | 361/683 |
| 2006/0056140 | A1 * | 3/2006 | Lev ........................... | 361/683 |
| 2007/0133156 | A1 * | 6/2007 | Ligtenberg et al. ......... | 361/681 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A latching device and an electronic device using the latching device are provided. The latching device is for fastening a cover assembly of the electronic device to a base assembly. The latching device includes a sliding member movably mounted in the cover assembly, a magnet fixed in the sliding member, and a hooking member pivotally fixing on the base assembly. The hooking member is made up of magnetic material. When the cover assembly is rotated to cover the base assembly, the hooking member is attracted by the magnet and hooks onto the cover assembly. When the sliding member slides, the sliding member pushes the hooking member to disengage from the cover assembly.

15 Claims, 5 Drawing Sheets

LATCHING DEVICE AND ELECTRONIC DEVICE USING THE SAME

BACKGROUND

1. Technical Field

The disclosure relates to latching devices and electronic devices employing the latching devices.

2. Description of Related Art

Portable electronic devices, such as portable computers, usually use a latching device to fasten a cover assembly to a base assembly. The latching device includes at least one hook. The hook usually protrudes out from the cover assembly. When the electronic device is in an unfolded state, the hook is exposed and prone to damage due to accidental or inadvertent impacts.

BRIEF DESCRIPTION OF THE DRAWINGS

The components of the drawings are not necessarily drawn to scale, the emphasis instead being placed upon clearly illustrating the principles of the latching device and the electronic device using the same. Moreover, in the drawings, like reference numerals designate corresponding parts throughout several views.

DETAILED DESCRIPTION

Figure 1:
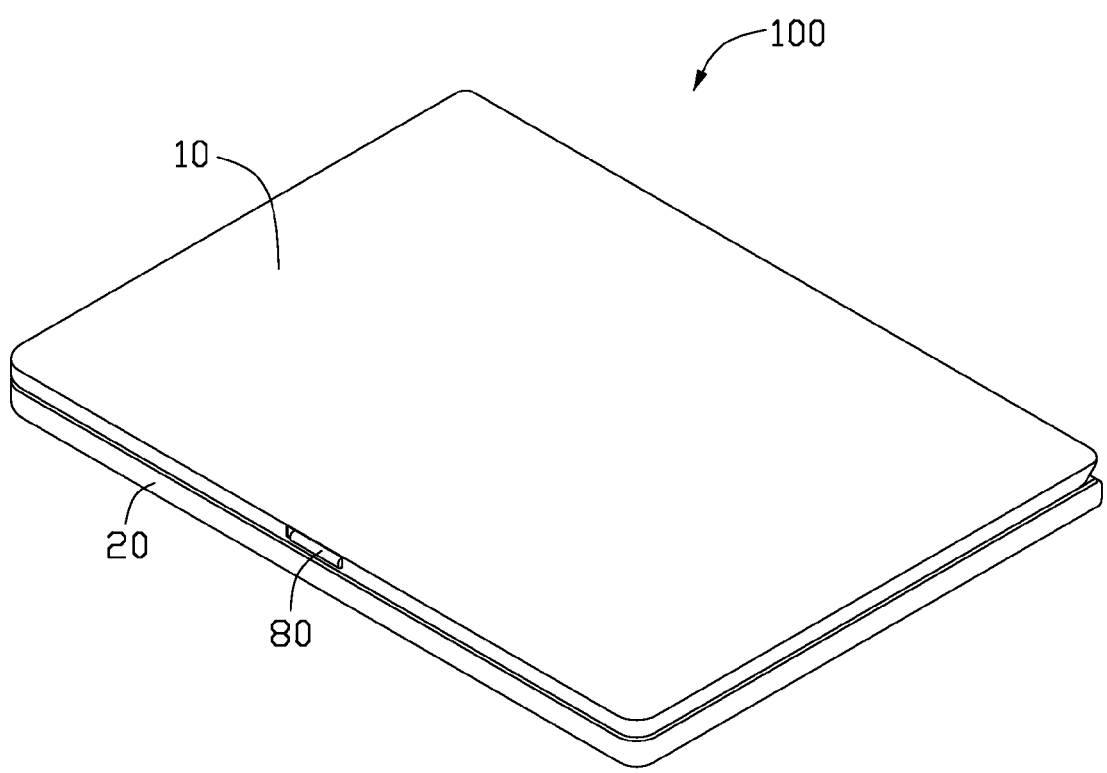
FIG. 1 is an isometric view of an electronic device with a latching device, in accordance with an exemplary embodiment.
Figure 2:
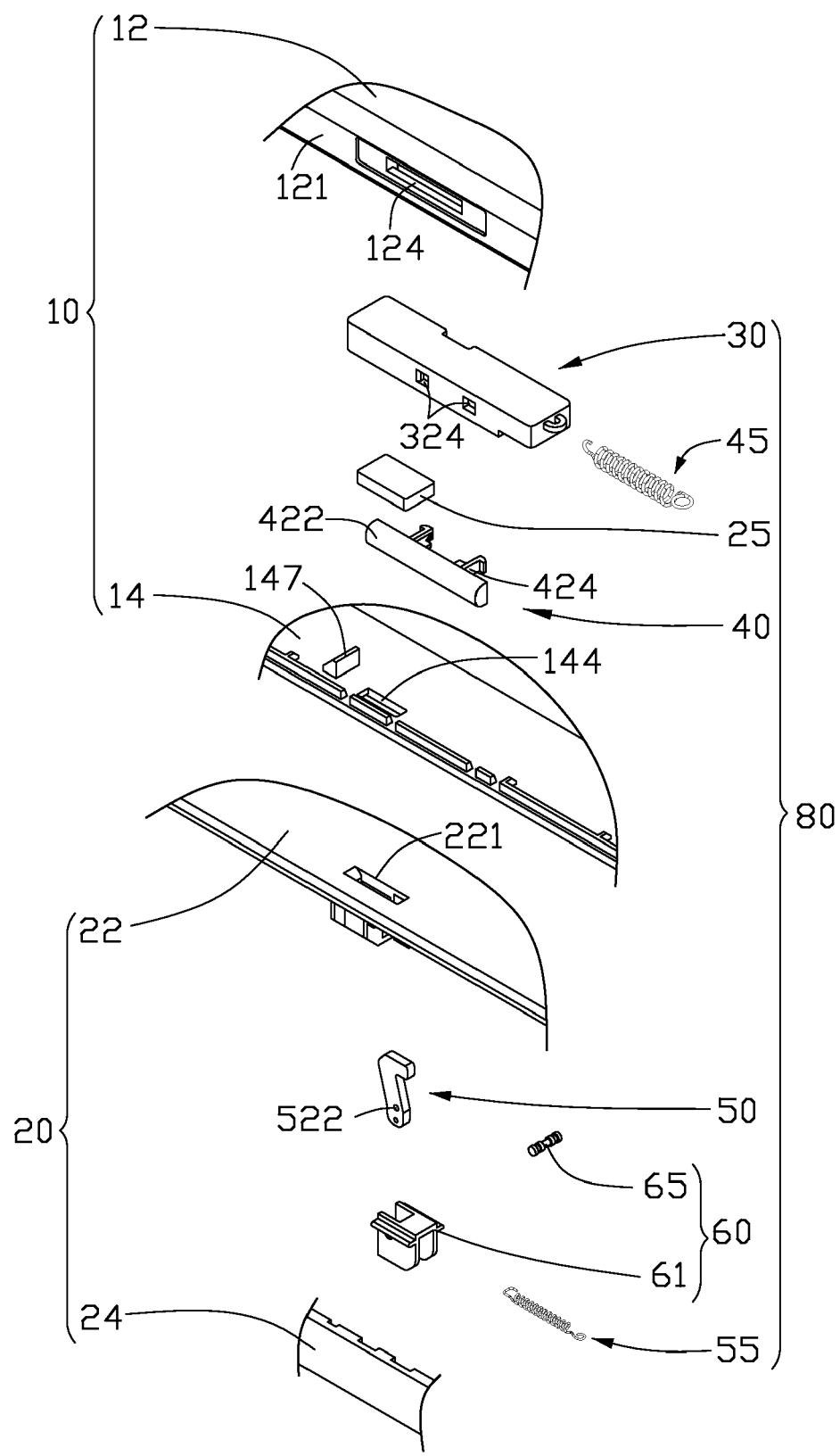
FIG. 2 is a partial, exploded perspective view of the electronic device showing the latching device of FIG. 1.
Figure 3:
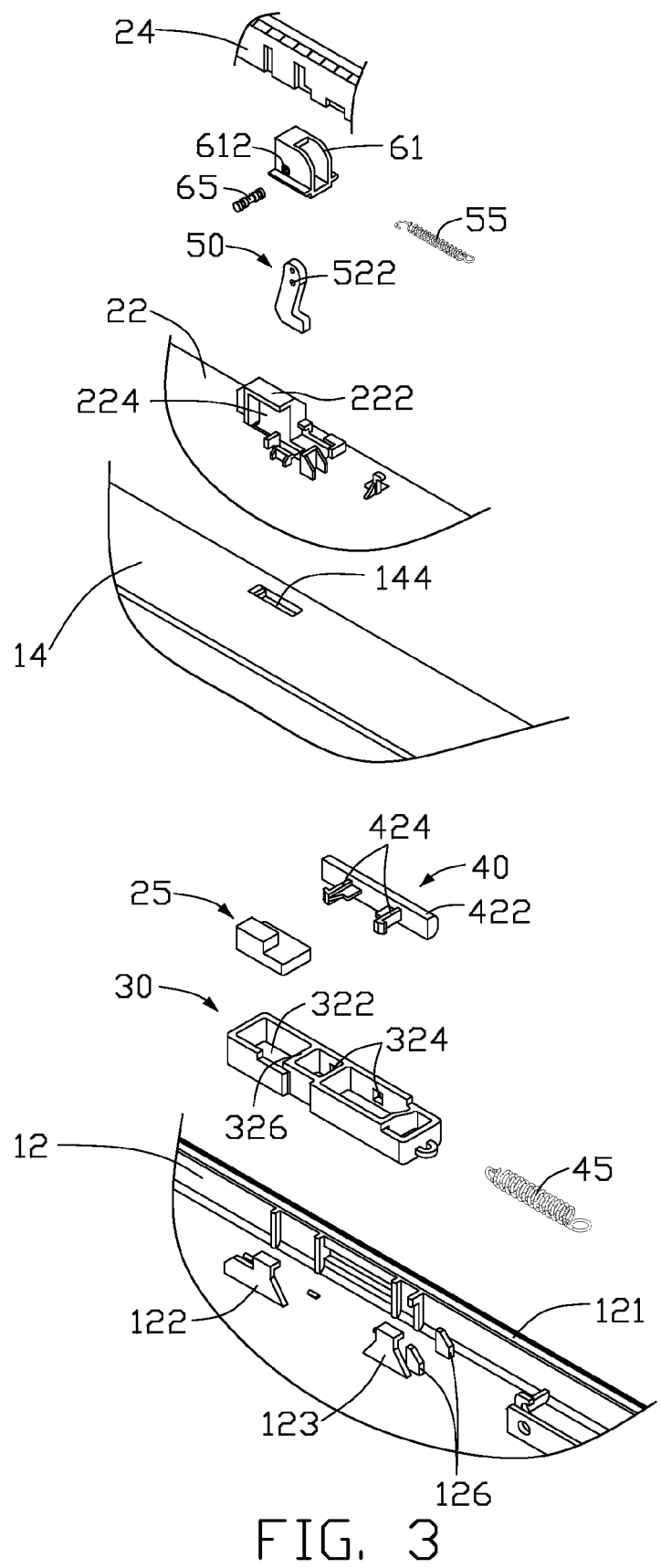
FIG. 3 is similar to FIG. 2, but viewed from another orientation.

Referring to FIGS. 1-3, an embodiment of an electronic device 10000 is illustrated. The electronic device 10000 includes a cover assembly 10, a base assembly 20, and a latching device 80.

The latching device 80 is for fastening/securing the cover assembly 10 to the base assembly 20 when the electronic device 100 is in a folded state, that is, when the cover assembly 10 covers the base assembly 20. The latching device 80 includes a sliding member 30 mounted in the cover assembly 10. A magnet 25 is fixed in the sliding member 30. An actuator member 40 is fixed on the sliding member 30 for driving the sliding member 30 to slide. A first elastic member 45 is disposed between the cover assembly 10 and the sliding member 30. A hook supporting member 60 is fixed in the base assembly 20 for pivotally fixing a hooking member 50 on the base assembly 20. A second elastic member 55 is disposed between the hooking member 50 and the base assembly 20.

When the cover assembly 10 is rotated to cover the base assembly 20, the hooking member 50 automatically rotates and hooks onto the cover assembly 10 due to the magnetic force of the magnet 25. When the actuator member 40 is pushed by an external force, the actuator member 40 forces the sliding member 30 to slide toward a predetermined orientation, and the hooking member 50 disengages from the cover assembly 10 due to the push of the sliding member 30. The first elastic member 45 pulls the sliding member 30 back to a first original position after the external force on the actuator member 40 is removed. The second elastic member 55 pulls the hooking member 50 back to a second original position after the cover assembly 10 is rotatably lifted from the base assembly 20. In the exemplary embodiment, the first elastic member 45 and the second elastic member 55 are springs.

The cover assembly 10 includes a cover 12 and a frame 14. A first through hole 124 is defined in a sidewall 121 of the cover 12. The actuator member 40 passes through the first through hole 124 for hooking onto the sliding member 30. A first baffle 122 and a second baffle 123 are correspondingly fixed on the bottom of the cover 12. The first baffle 122 and the second baffle 123 are located behind the sidewall 121 and arranged respectively at the left side and the right side of the first through hole 124. The first baffle 122 is substantially coplanar with the second baffle 123. Two stopper portions 126 are secured between the second baffle 123 and the sidewall 121. The first baffle 122, the second baffle 123, the sidewall 121, and the stopper portions 126 cooperatively prevent the sliding member 30 from sliding beyond a predetermined range. The first elastic member 45 has an end secured to the cover 12, and another end secured to the sliding member 30. The first elastic member 45 pulls the sliding member 30 back to the first original position after the external force on the actuator member 40 is removed.

A second through hole 144 is defined in the frame 14. When the cover assembly 10 is rotated to cover the base assembly 20, the hooking member 50 passes through the second through hole 144 and hooks onto the frame 14. A second stopper portion 147 is fixed on the top of the frame 14 opposite to cover 12. The first stopper portions 126 and the second stopper portion 147 are correspondingly located adjacent to opposite ends of the sliding member 30 for preventing the sliding member 30 from sliding beyond the predetermined range.

A first receiving space 322 is defined in the sliding member 30 for receiving the magnet 25. Two hook holes 324 are defined in a sidewall of the sliding member 30 for securing the actuator member 40 to the sliding member 30.

The actuator member 40 includes a slideable bar 422, and a pair of hooks 424 protruding out from the slideable bar 422. The hooks 424 pass through the first through hole 124 and hook into the hook holes 324, thereby fastening the actuator member 40 to the sliding member 30

The base assembly 20 includes a base board 22 and a base cover 24. A third through hole 221 is defined in the base board 22. The hooking member 50 passes through the third through hole 221 and the second through hole 144 in sequence to hook onto the cover assembly 10. A projection portion 222 is formed on the bottom of the base board 22 opposite to the base cover 24. The projection portion 222 includes a second receiving space 224. The second receiving space 224 communicates with the third through hole 221 and receives the hooking member 50 after the hooking member 50 is pulled away by the second elastic member 55. The second elastic member 55 has an end secured to the base board 22, and another end secured to the hooking member 50.

In the exemplary embodiment, the hooking member 50 is made up of magnetic material, and is L-shaped. A first fixing hole 522 is defined in the hooking member 50.

The hook supporting member 60 includes a supporting portion 61 fixed on the base cover 24 and a fixing portion 65. A second fixing hole 612 is defined in the supporting portion 61. The fixing portion 65 passes through the first fixing hole 522 and the second fixing hole 612 to pivotally fasten the hooking member 50 to the supporting portion 61.

For better understanding of the structure of the electronic device 100, an assembly procedure of the electronic device 100 is described below.

The assembly procedure mainly includes the following steps: utilizing glue-like material to fix the magnet 25 in the first receiving space 322; disposing the sliding member 30 among the first baffle 122, the second baffle 123, the first stopper portions 126, the second stopper portion 147, and the sidewall 121 of the cover 12; attaching one end of the first elastic member 45 to the cover 12 and another end to the sliding member 30; securing the cover 12 to the frame 14; fastening the actuator member 40 to the sliding member 30 by hooking the hooks 424 of the actuator member 40 into the hook holes 324 defined in the sliding member 30; fastening the hook supporting member 60 to the base 24 and the hooking member 50 to the supporting portion 61 by passing the fixing portion 65 through the first fixing hole 522 and the second fixing hole 612; attaching one end of the second elastic member 55 to the base board 22 and another end to the hooking member 50; and securing the base cover 24 to the base board 14 and the cover assembly 10 to the base assembly 20.

Figure 4:
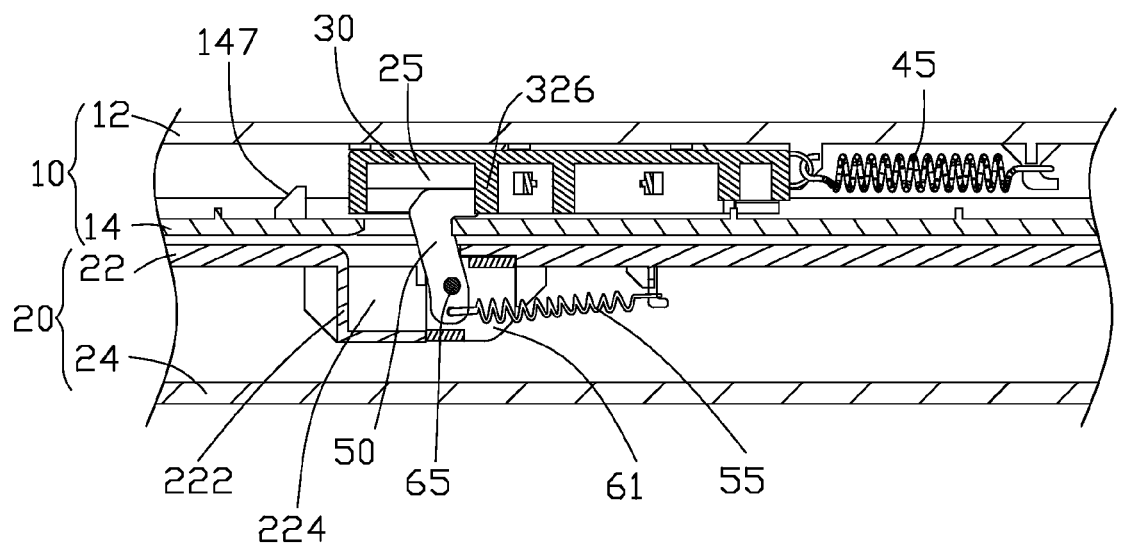
FIG. 4 is a partial, cross-sectional view of the electronic device of FIG. 1, showing the electronic device is in a latched state.
Figure 5:
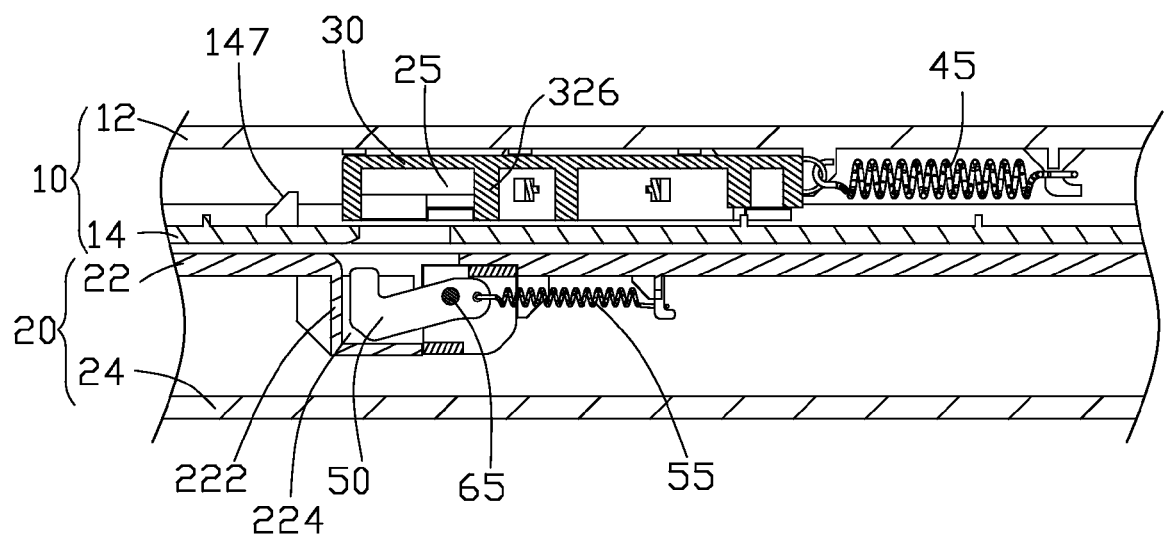
FIG. 5 is another partial, cross-sectional view of the electronic device of FIG. 1, showing the electronic device is in an unlatched state.

Referring to FIGS. 4-5, in FIG. 4, when the cover assembly 10 is rotated to cover the base assembly 20, the hooking member 50 is attracted by the magnet 25 installed in the sliding member 30 and passes through the third through hole 221 and the second through hole 144 in sequence until the hooking member 50 hooks onto the frame 14. When the hooking member 50 hooks the frame 14, a sidewall 326 of the first receiving space 322 resists the hooking member 50. The second elastic member 55 is pulled by the hooking member 50 and elastically deforms.

In FIG. 5, the slideable bar 422 (shown in FIG. 2) is pushed toward the predetermined orientation, and the sliding member 30 slides toward the predetermined orientation, and the sidewall 326 of the first receiving space 322 (shown in FIG. 3) pushes the hooking member 50 till the hooking member 50 disengages from the frame 14. After the hooking member 50 disengages from the frame 14, the cover assembly 10 can be rotatably lifted. The magnetic force between the magnet 25 and the hooking member 50 slowly disappears when the cover assembly 10 is rotatably lifted from the base assembly 20. The hooking member 50 is pulled back by the second elastic member 55 and then received in the second receiving space 224 of the projection portion 222. The sliding member 30 is also pulled back to the first original position by the first elastic member 45 when the external force on the slideable bar 422 is removed.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A latching device for fastening a cover assembly of an electronic device to a base assembly comprising:
    a sliding member movably mounted in the cover assembly, wherein the sliding member defines a first receiving space comprising a sidewall;
    a magnet fixed in the first receiving space; and
    a hooking member made up of magnetic material and pivotally fixed in the base assembly;
    wherein when the cover assembly is rotated to cover the base assembly, the hooking member is attracted by the magnet to hook onto the cover assembly, and resists the sidewall of the first receiving space when the hooking member hooks onto the cover assembly, and when the sliding member slides, the sidewall of the first receiving space pushes the hooking member to disengage from the cover assembly.

2. The latching device as described in claim 1, further comprising an actuator member mounted on the sliding member, wherein when the actuator member is pushed by an external force, the sliding member slides toward a predetermined orientation to disengage with the hooking member.

3. The latching device as described in claim 2, further comprising a first elastic member having an end attached to the cover assembly and another end attached to the sliding member, wherein the first elastic member is for pulling the sliding member back to a first original position after the external force on the actuator member is removed.

4. The latching device as described in claim 1, further comprising a hook supporting member, wherein the hook supporting member is fixed in the base assembly, and the hooking member is pivotally fixed on the hook supporting member.

5. The latching device as described in claim 1, further comprising a second elastic member, wherein the second elastic member has an end attached to the base assembly, and another end attached to the hooking member, and wherein the second elastic member is for pulling the hooking member back to a second original position after the cover assembly is rotatably lifted from the base assembly.

6. An electronic device comprising:
    a cover assembly;
    a base assembly; and
    a latching device;
    wherein a first through hole is defined in the cover assembly, a second through hole is defined in the base assembly; the latching device comprises a sliding member moveably mounted in the cover assembly, a hooking member pivotally attached to the base assembly, and a magnet, the sliding member defines a first receiving space comprising a sidewall, the magnet is fixed in the first receiving space, the hooking member is made of magnetic material, when the cover assembly is rotated to cover the base assembly, the hooking member is attracted by the magnet and passes through the second through hole and the first through hole in sequence to hook onto the cover assembly, and the hooking member resists the sidewall of the first receiving space when the hooking member hooks onto the cover, and when the sliding member slides, the sidewall of the first receiving space pushes the hooking member to disengage from the cover assembly.

7. The electronic device as described in claim 6, wherein the cover assembly comprises a cover and a frame, and the first through hole is defined in the frame.

8. The electronic device as described in claim 7, further comprising a first stopper portion fixed on the cover, and a second stopper portion fixed on the frame, wherein the first stopper portion and the second stopper portion cooperatively prevent the sliding member from sliding beyond a predetermined range.

9. The electronic device as described in claim 6, wherein the base assembly comprises a base board and a base cover, and the second through hole is defined in the base board.

10. The electronic device as described in claim 9, further comprising a projection portion protruding out from the base board, wherein the projection portion includes a second receiving space communicating with the second through hole for receiving the hooking member when the cover assembly is rotatably lifted from the base assembly.

11. The electronic device as described in claim 9, wherein the hooking member is pivotally fixed on the base cover.

12. The electronic device as described in claim 6, further comprising an actuator member mounted on the sliding member, wherein when the actuator member is pushed by an external force, the sliding member slides toward a predetermined orientation.

13. The electronic device as described in claim 12, further comprising a first elastic member having an end attached to the cover assembly and another end attached to the sliding member, wherein the first elastic member is for pulling the sliding member back to its original position after the external force on the actuator member is removed.

14. The electronic device as described in claim 6, further comprising a hook supporting member, wherein the hook supporting member is fixed on the base assembly, and the hooking member is pivotally fixed on the hook supporting member.

15. The electronic device as described in claim 6, further comprising a second elastic member having an end attached to the base assembly, and another end attached to the hooking member, wherein the second elastic member is for pulling the hooking member back to a second original position after the cover assembly is rotatably lifted from the base assembly.

* * * * *